US012664162B2

(12) United States Patent　　(10) Patent No.:　US 12,664,162 B2
Petro et al.　　　　　　　　　　(45) Date of Patent:　Jun. 23, 2026

(54) MERGING DATA QUERIES TO REDUCE DUPLICATE QUERIES

(71) Applicant: Shopify Inc., Ottawa (CA)

(72) Inventors: Adam Petro, Toronto (CA); Scott Walkinshaw, Bloomfield (CA); David Cameron, Kitchener (CA)

(73) Assignee: SHOPIFY INC., Ottawa (CA)

( * ) Notice: Subject to any disclaimer, the term of this patent is extended or adjusted under 35 U.S.C. 154(b) by 8 days.

(21) Appl. No.: 18/901,030

(22) Filed: Sep. 30, 2024

(65) Prior Publication Data

US 2026/0093696 A1　　Apr. 2, 2026

(51) Int. Cl.
　　*G06F 16/2453*　　(2019.01)
　　*G06F 16/2452*　　(2019.01)

(52) U.S. Cl.
　　CPC .. *G06F 16/24534* (2019.01); *G06F 16/24526* (2019.01)

(58) Field of Classification Search
　　CPC ..................... G06F 16/24534; G06F 16/24526
　　See application file for complete search history.

(56) References Cited

U.S. PATENT DOCUMENTS

2020/0293520 A1\*　9/2020　Werner ............... G06F 16/2452
2024/0126728 A1\*　4/2024　Liu ....................... G06F 16/212

FOREIGN PATENT DOCUMENTS

WO　　WO-2011130706 A2 *　10/2011　....... G06F 16/24534

OTHER PUBLICATIONS https://spec.graphql.org/draft/, GraphQL, Exact publication date unknown, but accessed and therefore published at least as early as Sep. 26, 2024, 193 pages.

\* cited by examiner

*Primary Examiner* — William Spieler

(57)　　　　　　ABSTRACT

During computer operation, it is sometimes necessary for the computer to retrieve data by performing a query. There may be situations in which multiple queries may need to be executed. In some embodiments, when multiple individual queries need to be executed, instead of executing each individual query to obtain data requested by each individual query, a single query may be generated from the individual queries. The single query encompasses all the data requests in each individual query and may therefore be referred to as a "merged query". The merged query is then executed, and the data returned is mapped to responses for the individual queries. Technical benefits may include the reduction or elimination of duplicate data fetching, e.g. fewer query operations/data fetches, while still fetching all data requested by all of the individual queries.

20 Claims, 10 Drawing Sheets

EXAMPLE:
SELECT * FROM Customers WHERE Name='Maria'; ~232

Query ~210

Data source 218

Response ~212

Computer 202

Processor 204

Memory 206

Network Interface 208

~234

EXAMPLE:

| Customer # | Name |
|------------|-------|
| 6321 | Maria |
| 8559 | Maria |
| 9004 | Maria |

Mapping 326 for
individual query 302

```
{
  "cart": {
    "key_in_merged": "cart",
    "suffix_with_context_key": null,
    "children": {
      "lines": {
        "key_in_merged": "lines",
        "suffix_with_context_key": null,
        "children": {
          "quantity": {
            "key_in_merged": "quantity",
            "suffix_with_context_key": null,
            "children": {}
          }
          "ID": {
            "key_in_merged": "ID",
            "suffix_with_context_key": null,
            "children": {}
          }
        }
      }
    }
  }
}
```

FIG. 5

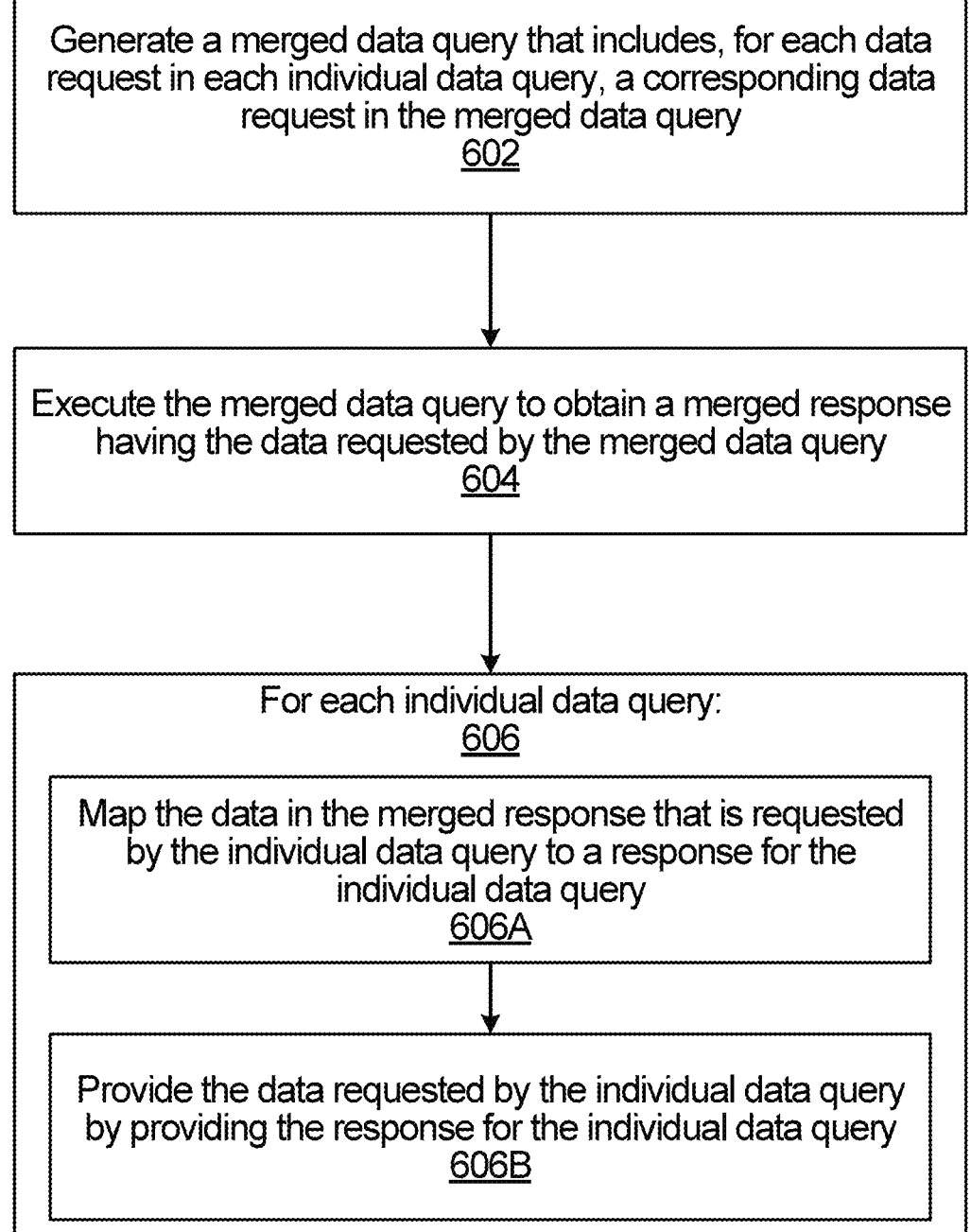

Generate a merged data query that includes, for each data request in each individual data query, a corresponding data request in the merged data query
602

Execute the merged data query to obtain a merged response having the data requested by the merged data query
604

For each individual data query:
606

Map the data in the merged response that is requested by the individual data query to a response for the individual data query
606A Provide the data requested by the individual data query by providing the response for the individual data query
606B

FIG. 6

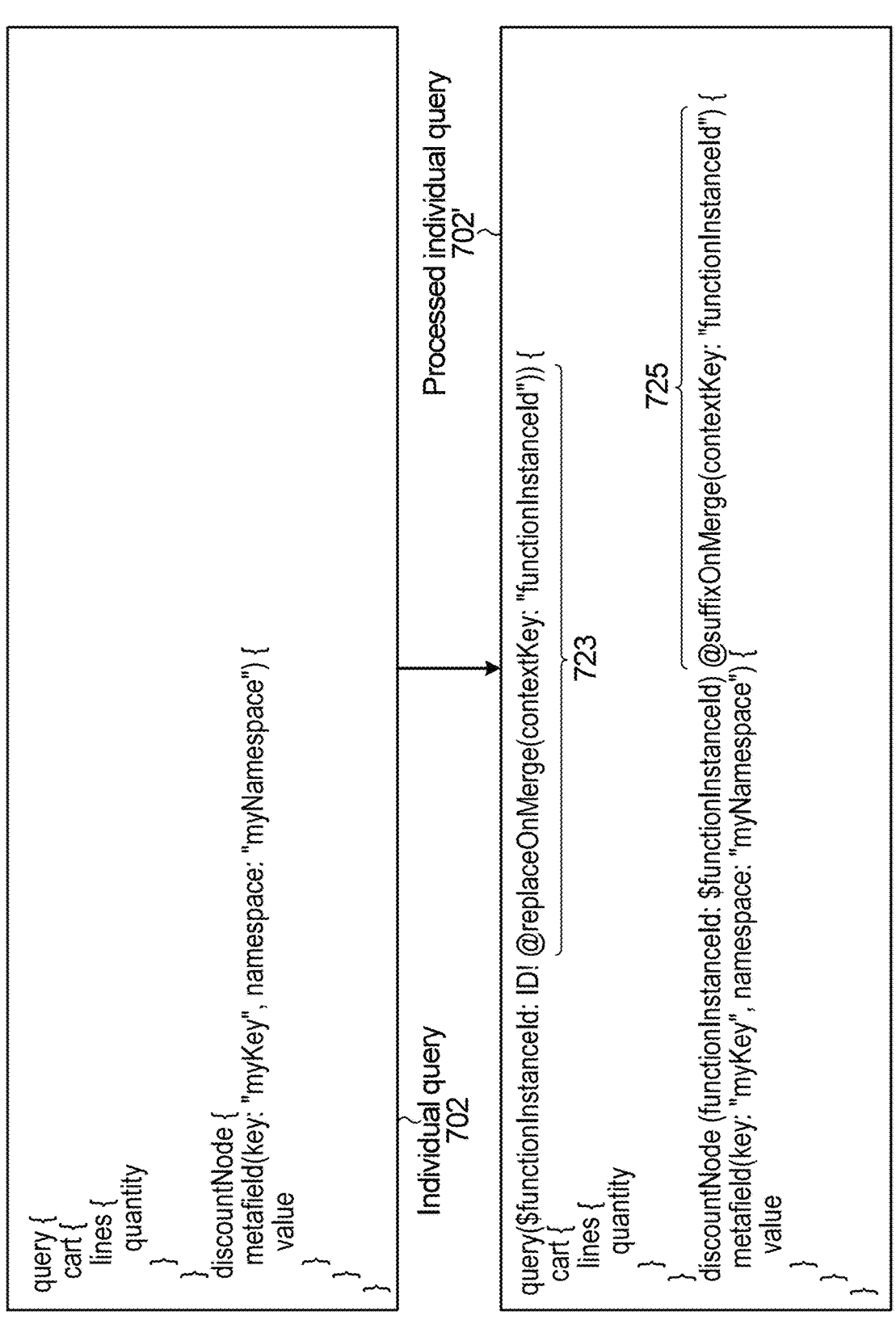

Individual query
702

```
query {
cart {
lines {
  quantity
}
}
discountNode {
metafield(key: "myKey", namespace: "myNamespace") {
  value
}
}
}
```

Processed individual query
702'

```
query($functionInstanceId: ID! @replaceOnMerge(contextKey: "functionInstanceId")) {
cart {
lines {
  quantity
}
}
discountNode (functionInstanceId: $functionInstanceId) @suffixOnMerge(contextKey: "functionInstanceId") {
metafield(key: "myKey", namespace: "myNamespace") {
  value
}
}
}
```

Mapping 742 for
individual query 712

```
"cart": {
   "key_in_merged": "cart",
   "suffix_with_context_key": null,
   "children": {
    "lines": {
      "key_in_merged": "lines",
      "suffix_with_context_key": null,
      "children": {
        "quantity": {
          "key_in_merged": "quantity",
          "suffix_with_context_key": null, ~ 753
          "children": {}
        }
       ...
    }
   }
"discountNode": {
   "key_in_merged": "discountNode",
   "suffix_with_context_key": "function_instance_id", ——755
   "children": {
     "metafield": {
       "key_in_merged": "metafield",
       "suffix_with_context_key": "api_client_id", ~ 757
       "children": {
        "value": {
          "key_in_merged": "value",
          "suffix_with_context_key": null,
          "children": {}
        }
      }
    ...
   }
}
```

FIG. 9

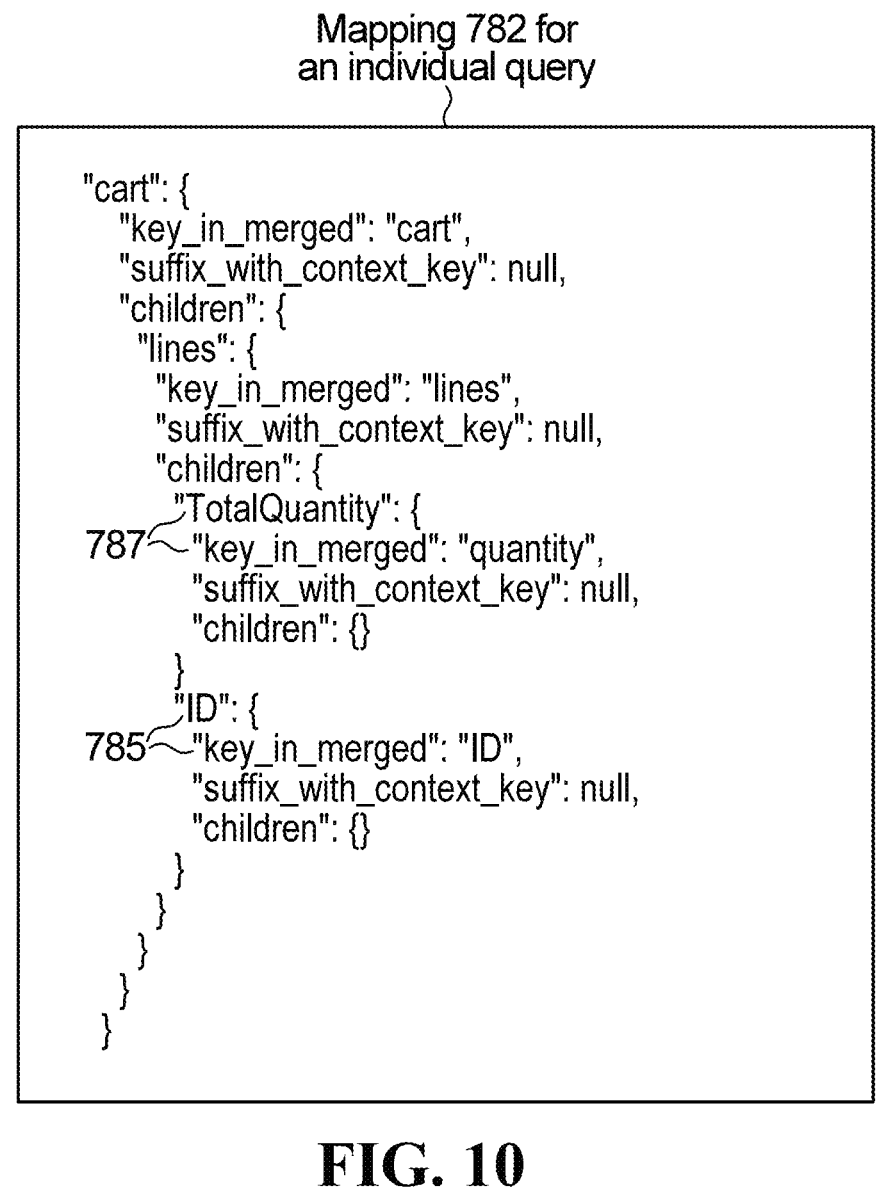

Mapping 782 for
an individual query

```
"cart": {
   "key_in_merged": "cart",
   "suffix_with_context_key": null,
   "children": {
     "lines": {
       "key_in_merged": "lines",
       "suffix_with_context_key": null,
       "children": {
       "TotalQuantity": {
787 "key_in_merged": "quantity",
         "suffix_with_context_key": null,
         "children": {}
       }
       "ID": {
785 "key_in_merged": "ID",
         "suffix_with_context_key": null,
         "children": {}
       }
     }
   }
  }
}
```

FIG. 10

MERGING DATA QUERIES TO REDUCE DUPLICATE QUERIES

FIELD

The present application relates to performing data queries by a computer, e.g. to obtain data from a database or other data source.

BACKGROUND

During computer operation, it is sometimes necessary for the computer to retrieve data by performing a data query. A data query is alternatively referred to herein as a query. In one example, a query involves sending a query request to an application programming interface (API) to request data that is accessible via the API, and then receiving the requested data from the API in response to the request. A query language, such as GraphQL™, may be used to specify the query. The response to the query may be returned in a defined format, e.g. in JavaScript™ Object Notation (JSON).

SUMMARY

When a computer is executing an application that involves a query, the time taken to perform the query may significantly impact the total execution time of the application. For example, execution of the application may involve retrieving data (via the query) and operating on the retrieved data by a function to obtain a result. Retrieving the data via the query may take as long as (or longer) than subsequently operating on the retrieved data to obtain the result.

Moreover, there may be situations in which multiple queries may need to be executed. For example, one or more events may trigger the execution of multiple applications, each application requiring its own respective query. In one example, in response to an event, the computer may need to execute several different applications in real-time or near real-time. Each application may include its own respective query and function to operate on the data retrieved by its query. Even if the different applications can be executed together or in a batch, each query may still be executed in a sequential manner, which may slow down how long it takes to execute all of the applications.

In some implementations herein, when multiple individual data queries need to be executed, instead of executing each individual data query to obtain data requested by each individual data query, a single query may be generated from the individual data queries. The single query encompasses all of the data requests in each individual query and may therefore be referred to as a "merged data query" or "merged query". The merged query is then executed, and the data returned is mapped to responses for the individual data queries.

Technical benefits of executing a single merged query instead of executing multiple individual queries include the following. First, the merged query may reduce or eliminate duplicate data fetching. For example, if two different individual queries request a same data field, then only a single fetch of that data field needs to be implemented in the merged query. There can exist scenarios in which different individual queries request the same or overlapping data fields. One example is when several different applications are being executed by the computer, and each of those applications includes its own respective query. The different applications may require the same or overlapping data, e.g.

because the applications are performing different functions on the same (or overlapping) data and/or because only a limited number of data fields can be retrieved. For example, the API might only allow for retrieval of a relatively small number of data fields. This can result in a high chance of overlap between data fields requested by the different applications in their queries. An example in the e-commerce space may be the execution of many different applications installed or included as part of an online store to perform functions, e.g. in response to an event that occurs in the online store, where each application includes one or more individual queries, and all the applications (and hence all the individual queries) request and operate on overlapping data in different ways. By executing a single merged query, instead of executing each individual query of each application, only a single fetch of a data field needs to be made in the merged query when that data field that is duplicated across two or more of the individual data queries. Besides the elimination of duplicate data fetches, another benefit of executing a single merged query instead of executing multiple individual queries is that only one iteration of the data structure is needed to obtain all relevant data. Said another way, the data structure only needs to be "walked" or "traversed" once to obtain the relevant data. These technical benefits result in fewer query operations/data fetches, while still fetching all data requested by all of the individual data queries.

In one aspect, there is provided a computer-implemented method. The method may include one or more of the following steps responsive to one or more events prompting execution of a plurality of individual data queries. A merged data query may be generated that includes, for each data request in each individual data query, a corresponding data request in the merged data query. For two or more of the plurality of individual data queries each requesting same particular data, only a single corresponding data request requesting the particular data might be included in the merged data query. The method may further include executing the merged data query to obtain a merged response having the data requested by the merged data query. The method may further include, for each individual data query, mapping the data in the merged response that is requested by the individual data query to a response for the individual data query. The method may further include providing the data requested by the individual data query by providing the response for the individual data query.

In some implementations, the method may further include generating and storing, for each individual data query, a map that indicates which data from the merged response is to be included in the response for the individual data query.

In some implementations, for each individual data query, the individual data query may specify one or more data requests by specifying one or more objects and, for at least one object, by specifying one or more fields of the object. In some implementations, the merged data query may also specify one or more objects and, for at least one object, may specify one or more fields of the object, where the specified one or more objects and the specified one or more fields in the merged data query may encompass every object and field specified in the individual data queries. In some implementations, for two or more of the individual data queries that request the same particular data by each specifying a same particular field within a same particular object, the merged query might only specify the particular object once and might only specify the particular field once within the particular object.

In some implementations, the method may further include, for each individual data query, generating the response for the individual data query, including providing in the response respective data mapped from the merged response for each of the one or more fields specified by the individual data query.

In some implementations, a structure of the individual data query, including the one or more objects and the one or more fields specified by the individual data query, may define a response structure of the response for the individual data query. In some implementations, generating the response for the individual data query may include generating the response to have the response structure defined by the structure of the individual data query.

In some implementations, the response structure for the individual data query may be in JSON format.

In some implementations, the map may indicate, for each field of the one or more fields specified by the individual data query, which data from the merged response is to be included for that field in the response for the individual data query.

In some implementations, responsive to multiple individual data queries of the plurality of individual data queries each requesting a same contextual data field, the method may further involve including, in the merged data query, multiple requests for the contextual data field, each request of the multiple requests associated with a respective tag that uniquely links the request back to a corresponding individual data query. The method may further involve, for each corresponding individual data query, including in the map for the corresponding individual data query an indication of the respective tag that is associated with the request for the contextual data field in the merged data query.

In some implementations, prior to the one or more events that prompt execution of the plurality of individual data queries, the method may include processing at least some of the plurality of individual data queries.

In some implementations, the processing may include: for each individual data query that requests the contextual data field, identifying the request for the contextual data field and modifying the individual data query to include an instruction to associate the unique tag with the request for the contextual data field.

In some implementations, the processing may include: for each individual data query of the plurality of individual data queries, validating the individual data query against a schema used to retrieve the data requested in the individual data query.

In some implementations, each individual data query of the plurality of individual data queries may be associated with a respective application that, when executed, utilizes data in the response for the individual data query. In some implementations, the processing may be performed responsive to deployment of the respective application.

In some implementations, each application may be executed responsive to an event, and execution of an application may prompt execution of the individual data query associated with the application.

In some implementations, a particular individual data query may include a particular data request that requires providing an ID as part of the data request, where the ID is associated with the particular individual data query.

In some implementations, the method may further involve including, in the merged data query, the particular data request and the ID. In some implementations, the method may further involve including, in the map for the particular individual data query, an indication of the ID to associate the particular data request in the merged data query with the particular individual data query.

In some implementations, a particular individual data query may include a custom name for particular data. In some implementations, the map for the particular individual data query may indicate a mapping back to the custom name from the corresponding data in the merged response.

In some implementations, executing the merged data query to obtain the merged response may include transmitting the merged data query to an API and receiving the merged response from the API.

In some implementations, the merged response may be in JSON format.

In another aspect, a system is provided that is configured to perform any of the methods disclosed herein. For example, the system may include at least one processor to directly perform (or control/instruct the system to perform) the method steps. In some implementations, the system includes at least one processor and a memory storing processor-executable instructions that, when executed by the at least one processor, cause the system to perform any of the methods described herein.

In another aspect, there is provided a computer-readable storage medium having stored thereon computer-executable instructions that, when executed by a computer (e.g. when executed by at least one processor of the computer), cause the computer to perform any of the methods disclosed herein. The computer-readable storage medium may be non-transitory.

BRIEF DESCRIPTION OF THE DRAWINGS

Embodiments will be described, by way of example only, with reference to the accompanying figures wherein:

FIGS. 4 and 5 illustrate example mappings for individual queries;

FIG. 6 illustrates a computer-implemented method performed by a computer, according to some implementations;

FIG. 7 illustrates an example of processing an individual query to obtain a processed individual query;

FIGS. 9 and 10 illustrate example mappings for an individual query.

DETAILED DESCRIPTION

For illustrative purposes, specific embodiments will now be explained in greater detail below in conjunction with the figures.

Figure 1:
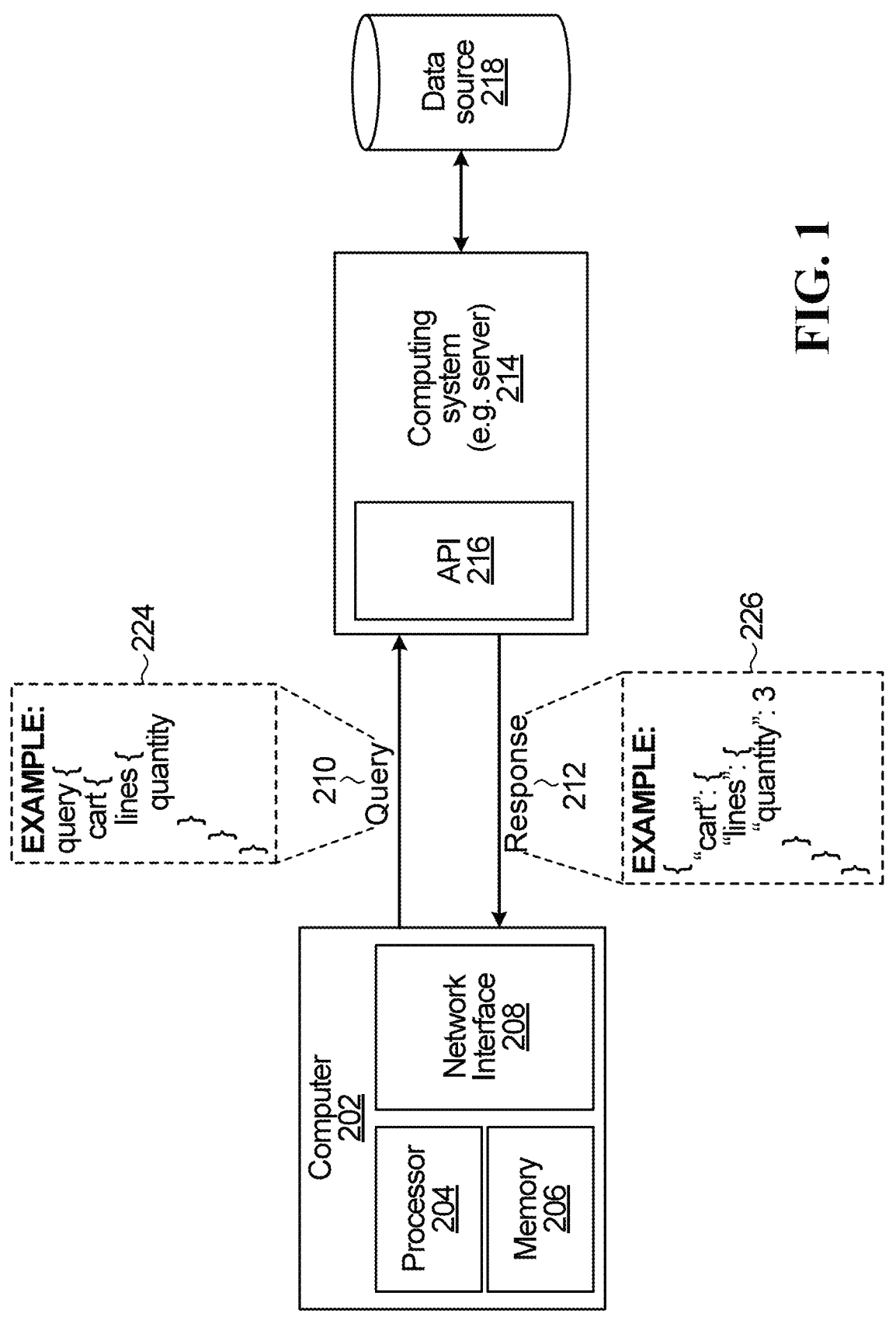
FIGS. 1 and 2 illustrate example systems for executing queries.

FIG. 1 illustrates an example system for executing queries. The system includes a computer 202. The computer 202 includes a processor 204, a memory 206, and a network interface 208. The processor 204 controls the operations of the computer 202. The processor 204 may be implemented by one or more processors that execute instructions stored in the memory 206. Alternatively, some or all of the processor 204 may be implemented using dedicated circuitry, such as an application specific integrated circuit (ASIC), a graphics processing unit (GPU), or a programmed field programmable gate array (FPGA). The memory 206 stores information (e.g. content and/or instructions, etc.). The network interface 208 interfaces with a network (not shown) to perform communication (transmit/receive) over the network. The structure of the network interface 208 will depend on how the computer interfaces with the network. For example, if the computer is mobile (e.g. a laptop), the network interface 208 may comprise a transmitter/receiver with an antenna to send and receive wireless transmissions over the network. If the computer 202 is connected to the network with a network cable, the network interface 208 may comprise a network interface card (NIC), and/or a computer port (e.g. a physical outlet to which a plug or cable connects), and/or a network socket, etc. In some implementations, the computer 202 may also include a user interface (not shown). For example, a user interface may include a display (which may be a touch screen), and/or a keyboard, and/or a mouse, etc.

In some implementations, the computer 202 may be distributed, e.g. it may comprise one or more servers or computing devices, in which case processor 204 might actually consist of multiple processors communicating with each other over a communication link (e.g. over a network), and similarly memory 206 might be distributed across multiple servers or computing devices.

During operation, the computer 202 may need to execute one or more queries. For example, one or more events may occur, and the one or more events may prompt execution of one or more queries. A query is a request for information to be extracted from a data source, such as a database. The term "data source", as used herein, is meant to also encompass multiple and/or distributed locations from which the data may be obtained, e.g. not necessarily a single storage location such as a single database. A query includes one or more data requests that specify the data being requested by the query. Executing the query may involve the computer 202 directly retrieving the data requested in the query or transmitting the query to another computing entity (e.g. server) that retrieves the data and returns it to the computer 202.

FIG. 1 illustrates an example in which a query 210 is executed by the computer 202 by transmitting the query 210 to a computing system 214 (e.g. a server). The computer system 214 retrieves, from a data source 218, the data requested in the query 210. The data source 218 might be, for example, a database or other form of memory/storage. An API 216 is used to receive the query 210 and return a response 212. For example, the computer 202 may execute the query 210 by transmitting the query 210 to the API 216 and receiving the response 212 from the API 216. The response 212 includes the data requested in the query 210. One example of query 210 is illustrated in stippled box 224. The query 210 is shown in GraphQL™ query language. In the example query 210, "cart" and "lines" are objects, e.g. the "cart" object type and the "lines" object type may each be defined in the GraphQL™ schema. In the example query 210, "quantity" is a field (sometimes alternatively referred to herein as a "data field") that resolves to a scalar type. The field "quantity" is being requested on the object "lines" which is nested within the object "cart". Responsive to receiving the query 210, the computing system 214 fetches the "quantity" field at the corresponding location in the data source 218 and returns the result. Specifically, the API 216 returns the response 212 having the result therein. An example of response 212 is shown in stippled box 226. The example response 212 is in a JSON format, and "3" is the result, i.e. the returned quantity data field, which is of the scalar type "Int" (integer).

Figure 2:
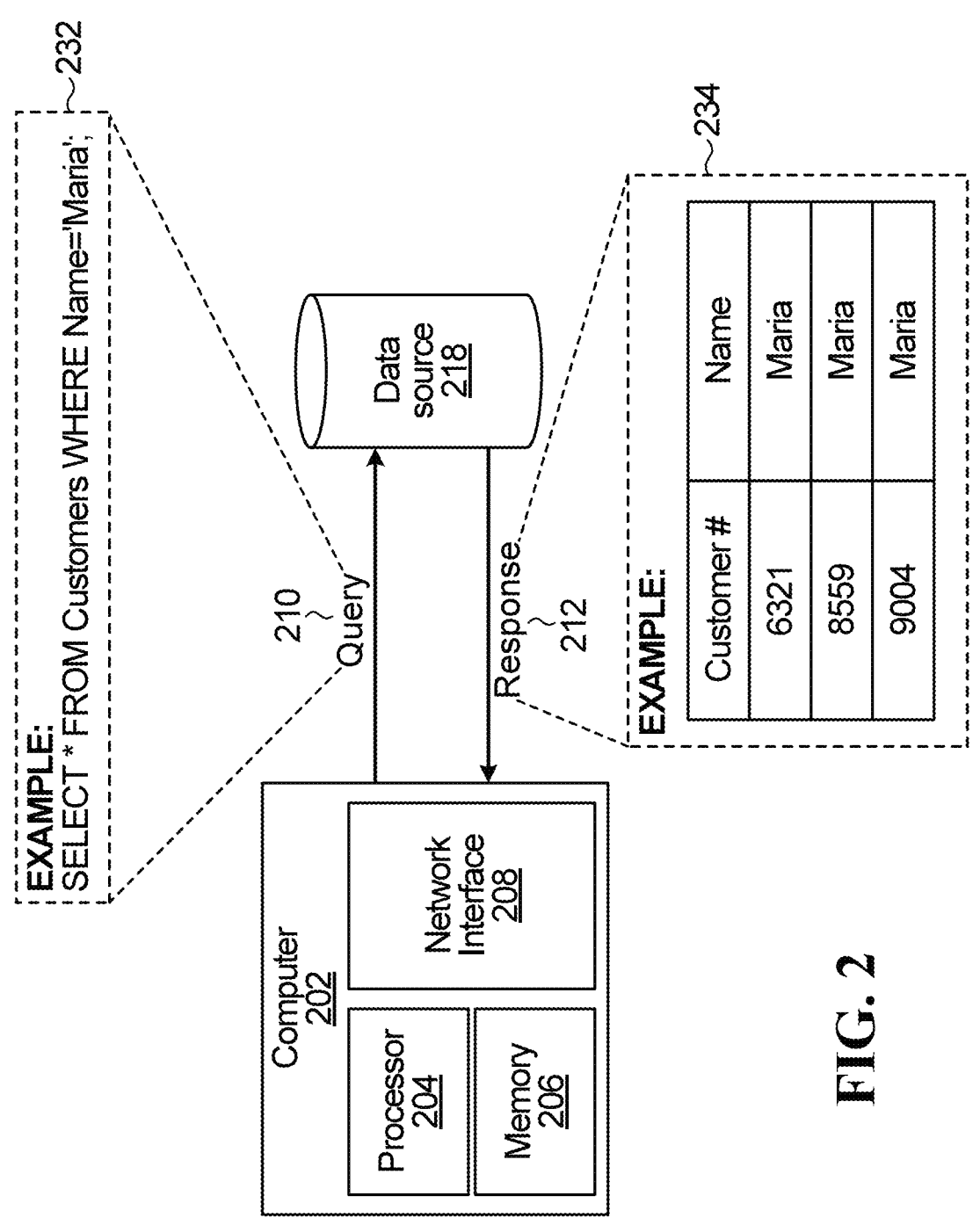

FIG. 2 illustrates an alternative example in which the query 210 is executed by the computer 202 by more directly accessing the data source 218. For example, the data source 218 may be part of the computer 202 or co-located on the same premises as the computer 202 and/or directly coupled to the computer 202 via a network connection. In the example in FIG. 2, a different query language is shown to demonstrate that the disclosure herein is not limited to GraphQL™. In the example of query 210 shown in stippled box 232, a data query based on Structured Query Language (SQL) is illustrated. The query requests columns from a database table ("Customers") for rows where the "Name" column has "Maria" for its value. The example response 212 in stippled box 234 shows the returned table values (shown in an actual table for ease of illustration).

The example implementations discussed below will primarily assume the situation in FIG. 1 in which the query is sent to an API, e.g. the query language is GraphQL™. However, the disclosure herein is not limited to such implementations. For example, the method of FIG. 6 described later is independent of the query language and architecture used.

There may be situations in which multiple queries may need to be executed by the computer 202. For example, one or more events may trigger the execution of multiple applications, each application requiring its own respective query. In one example, in response to an event, the computer 202 may need to execute several different applications in real-time or near real-time. Each application may include its own respective query and function to operate on the data retrieved by its query. Even if the different applications can be executed together or in a batch, each query may still be executed in a sequential manner, which may slow down how long it takes to execute all of the applications.

In some implementations herein, when multiple individual data queries need to be executed, instead of executing each individual data query to obtain data requested by each individual data query, a single query may be generated from the individual data queries. The single query encompasses all the data requests in each individual query and is referred to as a merged data query or merged query. The merged query is then executed, and the data returned is mapped to responses for the individual data queries.

As an example, the computer 202 may implement an e-commerce platform and execute applications related to online stores of the e-commerce platform. In response to an event that occurs for a particular online store (e.g. an "add-to-cart" event for that online store), a first application may be executed by the computer 202 to determine what product was added to the online cart and in what quantity, and then to check that the quantity does not exceed a certain limit. The application includes a query to obtain the product identifier (ID) and quantity of the product added to the cart, e.g. as shown below using computer language syntax based on GraphQL™:

```
query {
    cart {
        lines {
            quantity
            ID
        }
    }
}
```

In the example query above, the "cart" and "lines" are objects, with "lines" being an object nested in the object "cart". The "quantity" and "ID" are each fields on the object "lines". The fields "quantity" and "ID" each resolve to a scalar type. Although not shown in the example query above, the query may include one or more arguments that limit (e.g. filter) a value of one or more of the fields. For example, an argument specifying a particular cart (e.g. an argument specifying a cart ID corresponding to the online store) may be included in the query, such that the "quantity" and "ID" fields returned are specific to that cart.

In response to the same event, a different second application determines quantity and price of the product added to the online cart, e.g. because the second application executes to apply a shipping discount if at least two items of the product are purchased and the total price is above a certain amount. The second application includes a query to obtain the quantity and price of the product, e.g.:

```
query {
    cart {
        lines {
            quantity
            price
        }
    }
}
```

In the example query above, the "cart" and "lines" are objects, with "lines" being an object nested in the object "cart". The "quantity" and "price" are each fields on the object "lines". The fields "quantity" and "price" each resolve to a scalar type. Although not shown in the example query above, the query may include one or more arguments that limit (e.g. filter) a value of one or more of the fields. For example, an argument specifying a particular cart (e.g. an argument specifying a cart ID corresponding to the store) may be included in the query, such that the "quantity" and "price" fields returned are specific to that cart.

There is duplicate data fetching because both queries are retrieving the same "lines" object nested within the same "cart" object, and both queries are retrieving the same data field "quantity" on the "lines" object. The example assumes that either no arguments are passed (as is the case in the illustrated query language), or if there is an argument passed it is the same argument for each query, such that the quantity being retrieved is indeed the exact same data field in both queries.

A merged query may instead be executed in which the duplicate data field (quantity) is only retrieved once, e.g.:

```
query {
    cart {
        lines {
            quantity
            ID
            price
        }
    }
}
```

In this merged query, the duplicate nested "lines" object in the "cart" object (present in both individual queries) is only present once, and the duplicate "quantity" data field (present in both individual queries) is only present once.

Figure 3:
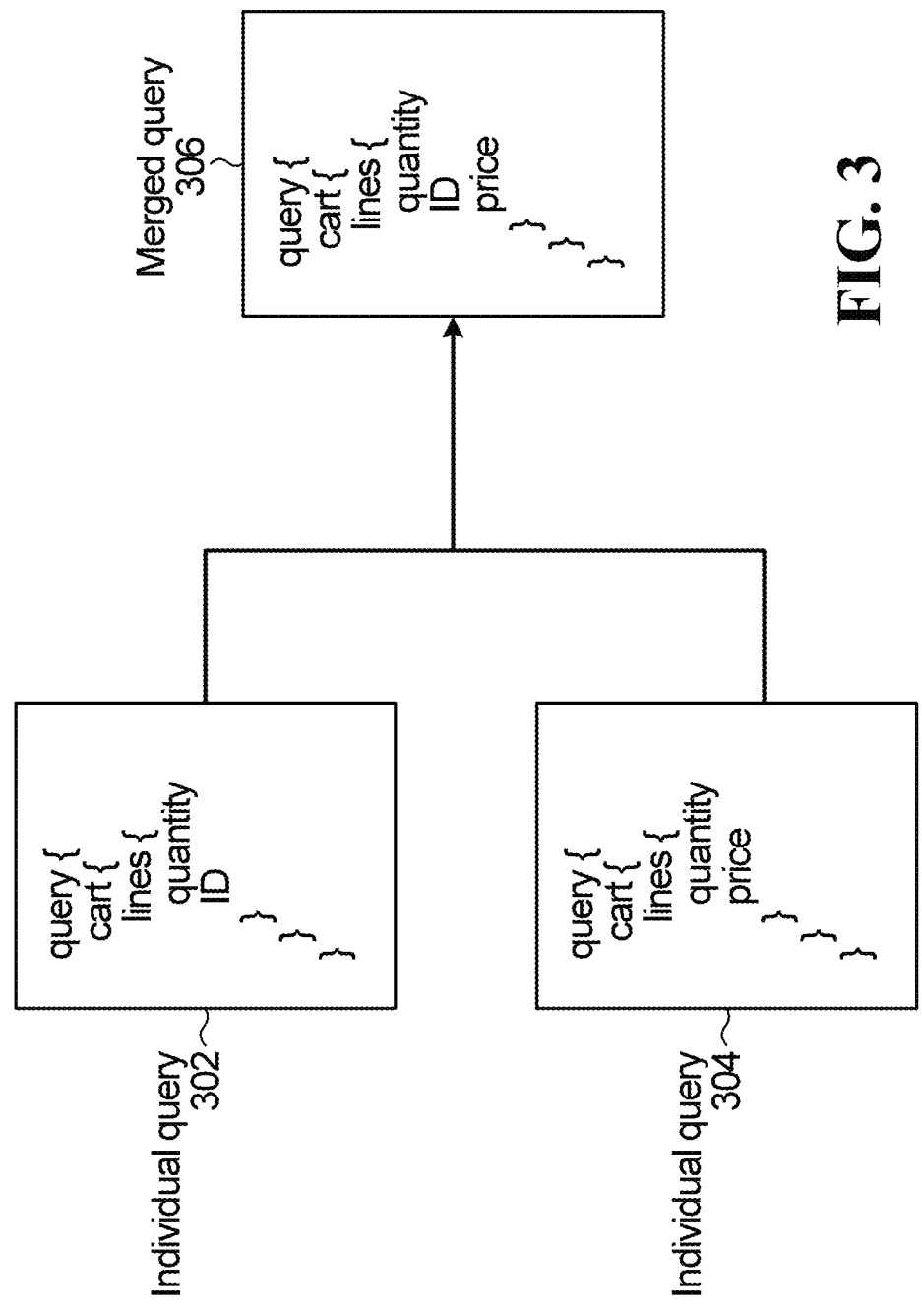
FIG. 3 illustrates an example merging of two individual queries.

FIG. 3 illustrates the merge of the example above. Individual query 302 and individual query 304 are merged into a single merged query 306. Individual query 302 specifies two objects, specifically "cart" and "lines", where "lines" is a nested object that is nested in the object "cart". Individual query 302 specifies two fields of the "lines" object, specifically the fields "quantity" and "ID".

Similarly, individual query 304 specifies the same two objects: "cart" and "lines", where "lines" is a nested object that is nested in the object "cart". Individual query 304 specifies two fields of the "lines" object, specifically the fields "quantity" and "price". The example assumes that if there are any arguments being passed (not illustrated), they are the same arguments for each individual query.

The merged query 306 specifies objects and fields that encompass every object and field specified in the two individual data queries 302 and 304. Duplicates in the individual queries 302 and 304 are only specified once in the merged query 306. In the example, the merged query 306 specifies the objects "cart" and "lines", where "lines" is nested in "cart", and specifies the fields "quantity", "ID", and "price". Note that when the individual queries 302 and 304 request a same particular field within a same particular object, the merged query only specifies the particular object once and only specifies the particular field once within the particular object. For example, the particular field "quantity" is only specified once in merged query 306, which is within the "lines" object (also only specified once), which is nested in the "cart" object (also only specified once).

The merged query 306 is then executed instead of individual queries 302 and 304.

The merged query 306 eliminates duplicate data fetching, e.g. by only having a single request for the "quantity" field. Besides the elimination of duplicate data fetches, another benefit of executing merged query 306 instead of executing individual queries 302 and 304 is that only one iteration of the data structure is needed to obtain all relevant data. Said another way, the data structure only needs to be "walked" or "traversed" once to obtain the relevant data. For example, individual query 302 requests the field "ID" and individual query 304 requests the field "price", which are not duplicate fields. However, they are fields within the same object. Therefore, to provide the requested data for the merged query 306, only a single iteration of the lines object of the cart object in the data structure is needed, which saves operations compared to performing a first iteration to execute the first individual query 302 and then a second iteration to execute the second individual query 304. The technical benefit of executing the merged query 306 is fewer query operations/data fetches, while still fetching all data requested by all of the individual data queries 302 and 304. Computer functionality is thereby improved by reducing the amount of computing resources needed to fetch all data requested by all of the individual data queries.

Note that in the example of FIG. 3, the two individual queries 302 and 304 have a lot of overlap, which results in more savings in computer operations/data fetches by executing the merged query 306 due to the elimination of more duplication. The inventors have discovered that there can exist scenarios in which several different individual queries may need to be executed that request the same or overlapping data, e.g. because the computer is executing different applications that each require the same or overlapping data, such as when the applications are performing different functions on the same (or overlapping) data and/or such as when only a limited number of data fields can be retrieved. For example, the API 216 might only allow for retrieval of a relatively small number of data fields, resulting in a high chance of overlap between data fields requested by the different queries.

When the merged query 306 is executed, a response 212 is returned that has all of the requested data. For example, the response 212 may be in JSON, depending upon the query language. A mapping may then be used to divide/"unmerge" the response 212 and thereby respond to each of the individual queries 302 and 304 with the applicable retrieved data. The response to each individual query 302 and 304 can be presented having a structure and format expected by that query.

Figure 4:
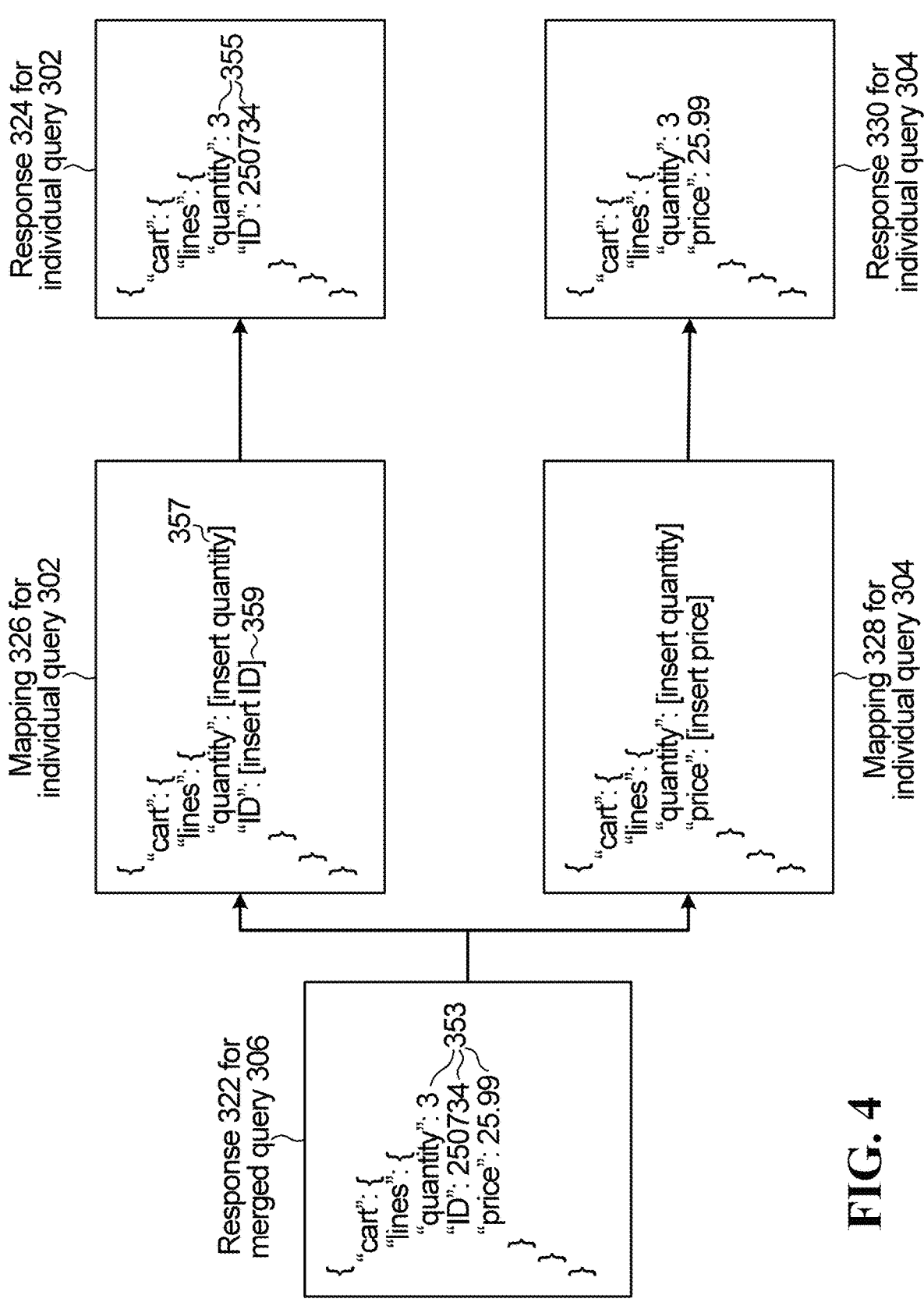

FIG. 4 illustrates example mappings 326 and 328 for the individual queries 302 and 304. Note that a mapping may alternatively be called a "response mapping" or a "mapping artifact".

An example response for merged query 306 is shown at 322 of FIG. 4. Since the example assumes GraphQL™ query language, the response 322 is in JSON and the response 322 has the same structure as defined by the merged query 306. The structure of the merged query 306 (shown in FIG. 3) is a nesting in which the fields "quantity", "ID", and "price" (in that order) are nested in the "lines" object, which is nested in the "cart" object. This structure defines the response structure of the response 322 shown in FIG. 4. Specifically, as shown at 353 of FIG. 4, the returned values for "quantity", "ID", and "price" are indicated, each along with its respective field label, in the same order as in the merged query 306, and they are nested in the "lines" object, which is nested in the "cart" object. The "structure" of a response may sometimes alternatively be referred to as the "shape" of the response. For example, the shape of the response 322 to merged query 306, shown in FIG. 4, is the same as the shape of merged query 306 shown in FIG. 3.

A response for the individual query 302 is shown at 324 of FIG. 4. Not all of the data returned in the merged query 306 needs to be provided in the response 324 for the individual query 302. Specifically, only the "quantity" and "ID" field values need to be provided, as shown at 355. Therefore, a mapping 326 (alternatively called a "map") for individual query 302 is generated and stored. The mapping 326 indicates which data in the merged response 306 is to be mapped to the response 324 for individual query 302. Since the example assumes GraphQL™ query language, the response 324 for the individual query 302 is in JSON and has the same structure as defined by the individual query 302. The structure of the individual query 302 (shown in FIG. 3) includes a nesting in which the fields "quantity" and "ID" (in that order) are nested in the "lines" object, which is nested in the "cart" object. This structure defines the response structure for individual query 302. Specifically, as shown at 355 of FIG. 4, in the response 324 for individual query 302 the returned values for "quantity" and "ID" are indicated, each along with its respective field label, in the same order as in the individual query 302, and they are nested in the "lines" object, which is nested in the "cart" object. The mapping 326 indicates the structure for the response 324 to individual query 302 and the mapping 326 also indicates, for each field specified by the individual query 302, which data from the merged response 322 is to be included for that field. This is shown at 357 and 359 in which the mapping 326 specifies that the "quantity" and "ID" data from the merged response 306 is to be included in the response 324 for the individual query 302.

Similarly, a mapping for individual query 304 is illustrated at 328 of FIG. 4, which is used to provide a response 330 for individual query 304.

The mappings 326 and 328 of FIG. 4 are simplified for case of explanation. For example, in an implementation, the mapping 326 for individual query 302 might instead be as shown in FIG. 5. In the example mapping 326 of FIG. 5, "key_in_merged" indicates the name of the field as used in the merged query 306, e.g. because the field in the merged query 306 might differ from an equivalent custom name used in the individual query 302. In the example mapping 326 of FIG. 5, "key_in_merged" is not strictly needed because the field names used in individual query 302 are the same as the field names uses in merged query 306. However, "key_in_merged" serves a useful purpose in an example mapping described later in relation to FIG. 10 in which a field in the merged query differs from an equivalent custom name used in the individual query. In the example mapping 326 of FIG. 5, "suffix_with_context_key" indicates a unique tag (applied as a suffix) for an entry in the merged query 306 that is unique to the individual query 302. In the example mapping 326 of FIG. 5, "suffix_with_context_key" is always set to "null" (it is not being used). However, "suffix_with_context_key" is used in an example mapping described later in relation to FIG. 9.

FIG. 6 illustrates a computer-implemented method performed by computer 202, according to some implementations. The method of FIG. 6 assumes that there exists a plurality of individual data queries. For example, although not necessary, the method of FIG. 6 may be performed responsive to one or more events that generate a plurality of individual queries and/or that prompt execution of a plurality of individual data queries. An example of an event is a change in state. Another example of an event is a user providing particular input (which might cause a change in state).

At step 602, the computer 202 generates a merged data query that includes, for each data request in each individual data query, a corresponding data request in the merged data query. For two or more of the plurality of individual data queries each requesting same particular data, only a single corresponding data request requesting the particular data is included in the merged data query. An example is merged query 306 of FIG. 3. In that example, the two individual data queries 302 and 304 each request same particular data: the "quantity" data field. In the merged query 306 there is only a single corresponding data request requesting the "quantity" data field. Although arguments are not included in the example of FIG. 3, if they were included it is assumed that the arguments in individual queries 302 and 304 would be the same such that the "quantity" field being requested in each query 302 and 304 is the same particular data value (e.g. the same cart). In FIG. 6, the "same particular data" is referring to the same data being requested, even if there are arguments in the queries. For example, it is not necessarily "same particular data" if one individual query requests the "quantity" field for cart ID 26492 and another individual query requests the "quantity" field for cart ID 26503.

At step 604, the computer 202 executes the merged data query to obtain a merged response having the data requested by the merged data query. An example of a merged response is response 322 of FIG. 4, which is a merged response 322 having the data requested by the merged data query 306 of FIG. 3.

Note that "executing" a query is alternatively referred to herein as "performing" the query. It refers to the computer 202 accessing the data source (e.g. database) or causing the data source to be accessed (e.g. via an intermediary) to obtain the data requested in the query from the data source. For example, the computer 202 may execute a query by transmitting it to an API, thereby instructing the computing system behind the API to access the data requested in the query from the data source. This is the case in the example in FIG. 1 in which a computing system 214 (e.g. a server, such as a GraphQL™ server) behind the API 216 accesses the data source 218 to obtain response 212. The computing system 214 is not necessarily part of the computer 202 executing the query, but the computer system 214 is the means by which the requested data is retrieved from the data source 218 for the computer 202 executing the query. As another example, the computer 202 may execute a query by accessing the data source 218 directly (or more directly) itself to obtain the data requested in the query, like in the example of FIG. 2.

At step 606, the following steps 606A and 606B are performed for each individual data query. At step 606A, the data in the merged response that is requested by the individual data query is mapped to a response for the individual data query, and at step 606B, the data requested by the individual data query is then provided by providing the response for the individual data query. An example is illustrated in FIG. 4 in which, for individual query 302 a mapping 326 is used to map data in the merged response 322 that is requested by the individual query 302 to a response 324 for the individual query 302. For example, the data returned for "quantity" and "ID" in merged response 322 (i.e. the values 3 and 250734) are mapped to the response 324 for the individual query 302 because these are the data requested in the individual query 302. The mapping 326 indicates, at 357 and 359 of FIG. 4, the inclusion of "quantity" and "ID" from the merged response 322 in the response 324 for the individual query 302.

The method of FIG. 6 is performed without executing the plurality of individual queries, that is, without separately accessing the data source for each individual query to obtain the data requested in that query. Instead of executing the plurality of individual data queries to obtain data requested by each individual data query, the steps of FIG. 6 are performed.

In some implementations, the method of FIG. 6 further includes generating and storing, for each individual data query, a map (alternatively referred to herein as a "mapping") that indicates which data from the merged response is to be included in the response for the individual data query. An example is in FIG. 4 in which mappings 326 and 328 are generated and stored for individual data queries 302 and 304.

The method of FIG. 6 may be performed for different query languages. In some implementations, the query language may be GraphQL™ or similar. For example, each query may be a GraphQL™ query, and each response to a query may adhere to the schema defined for the GraphQL™ API. A response may be in JSON, e.g. it may be a JSON object. Depending upon the query language, in some implementations of FIG. 6, for each individual data query, the individual data query may specify one or more data requests by specifying one or more objects and, for at least one object, by specifying one or more fields of the object. This is the case for example individual queries 302 and 304 in FIG. 3. For example, individual query 302 specifies two objects ("cart" and "lines"), each of which are a defined object type in the GraphQL™ schema. For the "lines" object, query 302 specifies the fields "quantity" and "ID". Note that the part of the query specifying the objects and fields on those objects may be referred to as the "selection set" of the query, e.g. the selection set specifies the fields and nested objects to be retrieve from the data source. The selection set therefore also defines the structure (also referred to herein as shape) of the data that will be returned in the response.

In some implementations of FIG. 6, the merged data query may also specify one or more objects and, for at least one object, may specify one or more fields of the object, where the specified one or more objects and the specified one or more fields in the merged data query encompass every object and field specified in the individual data queries. This is also the case in the example of FIG. 3. The merged query 306 specifies two objects ("cart" and "lines"), and for the "lines" object, merged query 306 specifies the fields "quantity", "ID", and "price". The specified objects in the merged query 306 and the specified fields in the merged query 306 encompass every object and field specified in the individual data queries 302 and 304. Specifically, the objects specified in the individual queries 302 and 304 are "cart" and "lines", which are encompassed by the merged query 306 because the merged query 306 specifies "cart" and "lines". Similarly, the fields specified in the individual queries 302 and 304 are "quantity" (in both query 302 and 304), "ID" (in query 302) and "price" (in query 304), which are encompassed by the merged query 306 because the merged query 306 specifies the fields "quantity", "ID", and "price". In some implementations of FIG. 6, for two or more of the individual data queries that request the same particular data by each specifying a same particular field within a same particular object, the merged query only specifies the particular object once and only specifies the particular field once within the particular object. This is also the case in the example of FIG. 3 in which the same particular data (the value for "quantity") is requested by both individual query 302 and individual query 304 by specifying a same particular field ("quantity") within a same particular object ("lines"). However, the merged query 306 only specifies the particular object ("lines") once and only specifies the particular field ("quantity") once within the particular object ("lines"). In this implementation, the "same particular field" is referring to the same data of the field being requested, even if there are arguments in the queries. For example, it is not necessarily the "same particular field" if one individual query requests the "quantity" field for cart ID 26492 and another individual query requests the "quantity" field for cart ID 26503.

In some implementations, the method of FIG. 6 may further include, for each individual data query, generating the response for the individual data query, including providing in the response respective data mapped from the merged response for each of the one or more fields specified by the individual data query. An example is shown in FIG. 4 in which a response 324 is generated for individual query 302 and also a response 330 is generated for individual query 304. In the response 324 for individual query 302, for each of fields "quantity" and "ID" specified in individual query 302 there is respective data ("3" for the field "quantity", and "250734" for the field "ID"), as shown at 355, which is mapped from the merged response 322 by way of mapping 326. Similarly, in the response 330 for individual query 304, for each of fields "quantity" and "price" specified in individual query 304 there is respective data ("3" for the field "quantity", and "25.99" for the field "price"), which is mapped from the merged response 322 by way of mapping 328.

In some implementations of the method of FIG. 6, a structure of an individual data query, including the one or more objects and the one or more fields specified by the individual data query if applicable (e.g. if it is a GraphQL™ query), defines a response structure of the response for the individual data query. This is the case in the example of FIG. 4 in which, as explained earlier, the structure (also called shape) of the response 324 for individual query 302 is defined by the structure of the individual query 302 shown in FIG. 3. In the example in FIG. 4, the mapping 326 indicates the structure of response 324 in addition to indicating which data from the merged response 322 are to be included in the response 324 for the individual query 302. Similarly, the structure of the response 330 for individual query 304 is defined by the structure of the individual query 304 shown in FIG. 3, and the mapping 328 (in FIG. 4) indicates the structure of response 330 in addition to indicating which data from the merged response 322 is to be included in the response 330 for the individual query 304.

In view of the above, in some implementations of step 606 of FIG. 6, a response for the individual data query is generated, and the response may be generated to have the response structure defined by the structure of the individual data query.

In some implementations of the method of FIG. 6, a response structure for an individual data query may be in JSON format, e.g. as might be the case if the query language is GraphQL™.

In some implementations of the method of FIG. 6, the mapping step referred to in step 606A may be performed using a map (alternatively called "mapping") that indicates, for each field of one or more fields specified by the individual data query, which data from the merged response is to be included for that field in the response for the individual data query. An example is in FIG. 4 in which mappings 326 and 328 are generated and stored for individual data queries 302 and 304. For individual query 302, the fields "quantity" and "ID" are specified. For each of these fields, the mapping 326 indicates which data from the merged response 322 is to be included for that field in the response 324 for the individual query 302. Specifically, as shown at 357, mapping 326 indicates that the data for "quantity" from the merged response 322 is to be included in the response 324, and at 359 mapping 326 indicates that the data for "ID" from the merged response 322 is to be included in the response 324.

In some implementations of the method of FIG. 6, each individual data query of the plurality of individual data queries is associated with a respective application that, when executed by computer 202, utilizes data in the response for the individual data query. For example, a given application may have one or more individual data queries that each request data, and the application uses data returned in a response for an individual data query in order to perform a function. Instead of the individual data queries each being executed, the merged query is generated and executed, and the applicable data returned in the response to the merged query is mapped to a response to each individual query, in the manner described above in relation to FIG. 6. In some implementations, each application is executed by the computer 202 in response to an event, e.g. the event may be triggered by a change in state, such as a user providing particular input. In some implementations, execution of an application prompts execution of an individual data query associated with that application. In some implementations, an event occurs that triggers execution of multiple applications (possibly all in parallel), and execution of each application prompts execution of its individual query. However, rather than executing all of the individual queries across each of the executing applications, the merged query is generated, executed, and a response to each individual query is provided based on the response to the merged query in the manner described above in relation to FIG. 6.

In some implementations of FIG. 6, executing the merged data query in step 604 to obtain the merged response may include transmitting the merged data query to an API and receiving the merged response from the API. The merged response from the API may be in JSON format, depending upon the query language used. This is the scenario in the example of FIG. 1. However, executing the merged data query does not necessarily need to involve transmitting the merged data query to an API and receiving the merged response from the API. For example, the computer 202 may execute the merged data query by directly or more directly accessing the data source, e.g. like in the example in FIG. 2.

Addressing Particular Technical Challenges that Occur in Some Implementations

The method of FIG. 6, and its various implementations described above, may face one or more of the following technical challenges in some implementations.

Sometimes requested data in an individual query is contextual, e.g. contextual to a given application and/or client (e.g. developer). The data value returned for the query may change, for example, depending upon which application queried for it. A data field having such data may be referred to as a "contextual field".

For example, assume GraphQL™ is the query language, and assume there is a defined object type "discountNode" in the GraphQL™ schema having multiple data fields defined therein, any of which can be requested by a query. Assume the fields of "discountNode" are contextual fields, e.g. contextual metafields. A first individual query associated with a first application being executed by the computer 202 may specify the object "discountNode" in the query in order to obtain data of one or more fields of "discountNode". A second individual query associated with a different second application being executed by the computer 202 might also specify the object "discountNode" in the query to obtain data of one or more fields of "discount Node".

Because "discountNode" includes contextual fields, to accommodate the different instances of "discountNode" associated with different contexts, in some implementations the merged query includes different entries for "discountNode", one for each respective individual query that specified "discountNode". To distinguish between the different entries, a tag (e.g. in the form of a suffix or the like) may be added to each instance of "discountNode" to distinguish between the multiple entries of "discountNode" in the merged query. The rules of the query language may also require uniquely distinguishing the entries, e.g. via the tag. A step of preparing the tags may be performed as part of preprocessing an individual query, e.g. on deployment of the application having the individual query. Preprocessing (also referred to herein as simply "processing") involves preparing the individual query so that it may be more easily merged with other queries without resulting errors. For example, the processing may include checking the query is valid and/or preparing the needed tags. An individual query that is processed may be referred to as a "processed query", alternatively called a "preprocessed query" or a "modified query" or a "mergeable query" or a "normalized query".

FIG. 7 illustrates an example of processing an individual query 702 to obtain a processed individual query 702'. Individual query 702 is similar to the example queries illustrated earlier in that individual query 702 specifies a "lines" object nested in a "cart" object. The "quantity" field on the "lines" object is being requested. However, the GraphQL™ schema further defines a "discountNode" object type and "metafield" object type, and individual query 702 also specifies a "discountNode" object, and specifically requests a field "value" on a "metafield" object nested in the "discountNode" object.

The "discountNode" object in individual query 702 queries data unique to this individual query 702, and so a processing step occurs to modify the individual query 702 to enable a unique tag (in this case a suffix) to be assigned to this instance of "discountNode" when merging occurs. The resulting processed individual query 702' includes a GraphQL™ directive "replaceOnMerge", shown at 723, that results in the variable identifier being replaced by the value of contextKey. The processed individual query 702' further includes a GraphQL™ directive "suffixOnMerge", shown at 725, that results in a field alias suffix being added using the value of contextKey.

Then, when the processed individual query 702' is merged with other individual queries to generate the merged query, the "discountNode" is assigned a unique tag in the merged query, which in the example is in the form of a suffix. The same occurs with other individual queries that include "discountNode".

Figure 8:
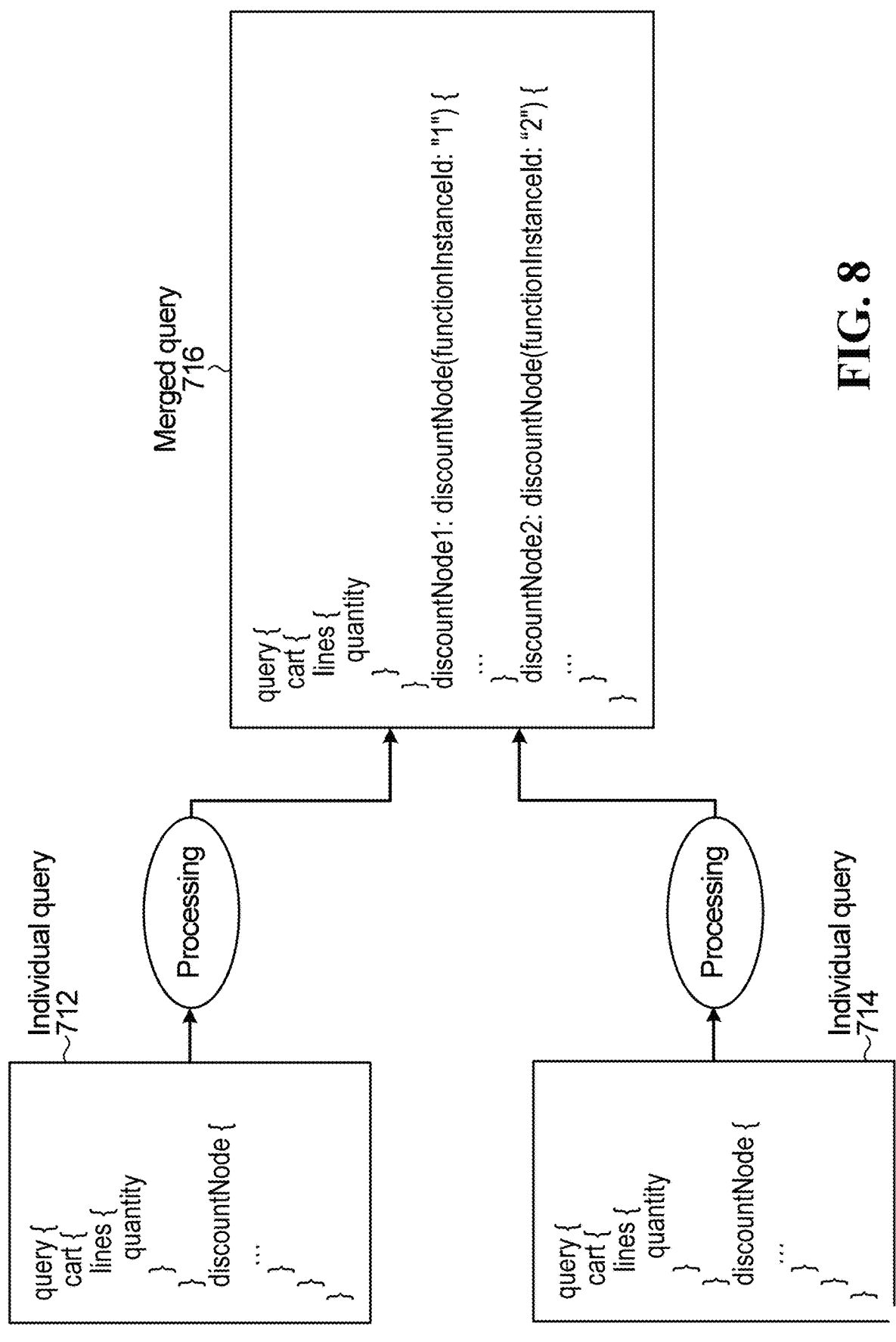
FIG. 8 illustrates an example of generating a merged query from two individual queries that each request a contextual field.

In the merged query, there might be, for example, two "discountNode" requests originating from two different individual queries, and each is uniquely distinguished and mapped to its associated individual query via a different "functionInstanceID". FIG. 8 illustrates an example of generating a merged query from two individual queries that each request a contextual field. Individual query 712 specifies a "lines" object nested in a "cart" object, and the "quantity" field on the "lines" object is being requested. Individual query 712 further specifies a "discountNode" object, and some contextual fields (just shown as " . . . " in FIG. 8) on "discountNode" are being requested. Similarly, individual query 714 includes the same "lines" object nested in the same "cart" object, and the same "quantity" field on the "lines" object is being requested. Individual query 714 further specifies a "discountNode" object, and some contextual fields (just shown as " . . . " in FIG. 8) on "discountNode" are being requested. Each individual query 712 and 714 undergoes processing, an example of which is explained above in relation to FIG. 7. The processing identifies a contextual field in the individual query, which in this case is a field associated with "discountNode", and in response the processing modifies the individual query to include an instruction to associate a unique tag with the request for the contextual field. The unique tag in this instance is a unique suffix added to each occurrence of "discountNode" in the merged query 716 to uniquely link the occurrence back to the right individual query. As shown in FIG. 8, merged query 716 includes two "discountNode" entries, each having a unique tag (suffix) "1" and "2" added to uniquely identify to which individual query the data retrieved for a given "discountNode" belongs. In merged query 716, "discountNode1" and "discountNode2" are each associated with a respective "discountNode" request in a respective different individual query, e.g. "discountNode1" is associated with the "discountNode" request in individual query 712 and "discountNode2" is associated with the "discountNode" request in individual query 714.

The mapping generated for an individual query, which is used to map the response of the merged query to the response to the individual query, can identify the tag applied to "discountNode" so that the response to that "discountNode" entry in the merged query can be mapped back to the correct individual query. For example, FIG. 9 illustrates an example mapping 742 for individual query 712. In mapping 742, the "suffix_with_context_key" field is "null" for fields that are not contextual, e.g. for the data field "quantity" as shown at 753. However, for "discountNode", which has values specific to this particular individual query, the "suffix_with_context_key" field shown at 755 includes the "function_instance_id", i.e. the unique ID that has been assigned that links that "discountNode" in merged query 716 to the associated individual query 712. This allows, at mapping step 606A of FIG. 6, for the data returned by this "discountNode" entry in the merged query 716 to be mapped back to the correct individual query 712.

In view of the above, it will be appreciated that the merging and mapping operations of the method of FIG. 6 may, in some implementations, involve accommodating contextual data fields, e.g. by using tags in the manner explained above.

Therefore, returning to FIG. 6, in some implementations of the method of FIG. 6 there may be multiple individual data queries that request a same contextual data field, e.g. that each specify a same object requiring context (e.g. a same object that includes a contextual data field). In some implementations, responsive to multiple individual data queries of the plurality of individual data queries each requesting a same contextual data field, the method of FIG. 6 may involve including, in the merged data query, multiple requests for the contextual data field, each request of the multiple requests associated with a respective tag that uniquely links the request back to a corresponding individual data query. An example is merged query 716 of FIG. 8 in which multiple requests for the same contextual field in "discountNode" are included in the merged query 716, one corresponding to individual query 712 and the other corresponding to individual query 714. Each request in merged query 716, i.e. each instance of "discountNode" in merged query 716, is associated with a respective tag that uniquely links the request back to a corresponding individual data query. For example, the tag in the form of a suffix "1" associates "discountNode1" back to individual query 712, and the tag in the form of a suffix "2" associates "discountNode2" back to individual query 714.

In some implementations of the method of FIG. 6, for each corresponding individual data query that corresponds to a respective instance in the merged query requesting a contextual field, a map (also called a "mapping") for that individual query is generated and stored, and that map includes an indication of the respective tag that is associated with the request for the contextual data field in the merged data query. For example, the mapping 742 for individual query 712 in FIG. 9 includes an indication 755 of a respective tag (defined by "function_instance_id") that is associated with the corresponding request ("discountNode1") in the merged query 716.

A technical benefit is achieved in that a merged query can be executed instead of the plurality of individual queries, resulting in the reduced computer operations discussed above (e.g. fewer query operations/data fetches compared to executing each individual data query, while still fetching all data requested by all of the individual data queries). Moreover, portions of the individual queries having context, e.g. a request for a same contextual field in two different individual queries, can still be accommodated by configuring the merged query to associate a respective tag with each entry of the request for the contextual field in the merged query, in order to uniquely link each instance of the request for the contextual field in the merged query back to a corresponding individual query. This allows for merging of individual queries regardless of whether those individual queries request a same contextual data field, e.g. regardless of whether those individual queries specify a same object with different context.

In some implementations of the method of FIG. 6, the method may include processing at least some of the plurality of individual data queries, e.g. prior to generating and/or executing the merged query, such as prior to one or more events that prompt execution of the plurality of individual data queries. The processing may include: for each individual data query that requests a contextual data field, identifying the request for the contextual data field and modifying the individual data query to include an instruction to associate the unique tag with the request for the contextual data field. An example is explained in relation to FIG. 7 in which individual query 702 requests a contextual data field associated with "discountNode". Processing occurs to identify this request and to modify the data query 702 to include an instruction to associate the unique tag with the request for the contextual data field. The result is processed individual query 702' including the "replaceOnMerge" and "suffixOnMerge" instruction to associate a unique tag (a suffix) with the request on the "discountNode" object. This can result in the technical benefit of preparing the individual data queries for merging in advance, before the merged query is generated and executed, to make it faster to generate and execute the merged query.

In view of the above, the method of FIG. 6 may sometimes include the specific processing described above and in relation to FIGS. 7 and 8, e.g. processing that modifies an individual query to include an instruction in that individual query to associate a unique tag with a request for a contextual data field in that query. Optionally, FIG. 6 might additionally or instead include different processing of one or more of the individual queries. For example, in some implementations, one, some, or all of the individual data queries may each be processed to validate the individual data query against a schema used to retrieve the data requested in the individual data query. This can result in the technical benefit of validating the individual data queries in advance, before the merged query is generated and executed, to make it faster to generate and execute the merged query because validation does not need to be done as part of the merging.

In some implementations of FIG. 6, it may be that each individual data query of the plurality of individual data queries is associated with a respective application that, when executed by the computer 202, utilizes data in the response for the individual data query, and any of the processing referred to above (e.g. the processing described in relation to FIGS. 7 and 8 and/or the processing to validate the query) is performed responsive to deployment of the respective application. This has the technical benefit of front-loading the processing upon application deployment, prior to real-time execution of the application, thereby saving computer operations and decreasing execution time during real-time execution of the application because the processing has already been done, e.g. the queries have already been validated and/or the instructions to add the needed unique tags have already been added to the queries.

Another challenge that may occur in some implementations of the method of FIG. 6 is that an individual query may include a custom name (also called an "alias") for data that is returned in the query's results. For example, two applications being executed by computer 202 may each be associated with a respective query that requests a same data field. However, the code of the first application might custom name the returned data "TotalQuantity", and the code of the second application might custom name the same returned data "CartQuantity", and possibly even custom name other returned data as "TotalQuantity". The custom names need to be preserved. To address this, in some implementations at generation of the merged query, the definition of the custom name in the individual query can be used to understand what data field is being requested, e.g. if "TotalQuantity" is a custom renaming of the "quantity" data field, then ensure the merged query requests the "quantity" data field. Upon dividing up the response of the merged query, the mapping for each individual query can map back to the custom name. For example, FIG. 10 illustrates an example mapping 782 for an individual query in which "TotalQuantity" is used instead of quantity, where again an assumption is being made that the query language is GraphQL™. In the individual query, the code of the query uses the custom name (alias) "Total Quantity" to refer to the "quantity" field of the GraphQL™ schema. The mapping 782 therefore maps the returned "quantity" field in the merged response back to the field "TotalQuantity" in the response for the individual query. As shown in FIG. 10, each object and field in the mapping 782 has an associated "key_in_merged" field that indicates the name of the object or field in the merged query. In most cases in this example, the name of the field or object in the merged query is the same as its name in the individual query. For example, for the field "ID" in the individual query, that field is also called "ID" in the merged query, and hence the "key_in_merged" is "ID", as shown at 785. However, at the instance shown at 787, the name of the field "quantity" in the merged query is named "TotalQuantity" in the individual query, and hence the "key_in_merged" associated with "TotalQuantity" indicates "quantity". This allows for the mapping 782 to map the data for "quantity" in the merged response back to the "TotalQuantity" in the response for the individual query.

In view of the above, in some implementations of the method of FIG. 6 a particular individual data query may include a custom name for particular data, and in such a situation the map for the particular individual data query indicates a mapping back to the custom name from the corresponding data in the merged response. The mapping 782 of FIG. 10 is an example of such a mapping. The individual query includes the custom name "TotalQuantity", and the corresponding data in the merged response ("quantity") is mapped back to "TotalQuantity" via the "key_in_merged" label, shown at 787 of FIG. 10.

A technical benefit is achieved in that a merged query can be executed instead of the plurality of individual queries, resulting in the reduced computer operations discussed above (e.g. fewer query operations/data fetches compared to executing each individual data query, while still fetching all data requested by all of the individual data queries). Moreover, custom names in individual queries can be accommodated. This allows for merging of individual queries regardless of whether those individual queries have custom names.

Note that the example above, e.g. in relation to FIG. 10, is only one way to accommodate a custom name (alias) in an individual query when performing the method of FIG. 6. Other ways are possible. For example, instead of the mapping described above, other forms of storing translation artifacts may work to associate a custom name in an individual query with particular data from a merged response. The same general operations can be performed of: (i) "normalizing" the query (e.g. to use the name from the schema, such as "quantity" instead of the custom name "TotalQuantity"), (ii) storing a means (e.g. translation artifact) to undo it, and (iii) merging the queries with a means to unmerge the response back to the right requestor. The tagged JSON shown in FIG. 10 is only one example and does not have to be used.

Another challenge that may occur in some implementations of the method of FIG. 6 is that an individual query may include a request for a data field, where the request must include an identifier (e.g. "client ID" or "API client ID") that is required to retrieve that data field. This might be because of the nature of the data field (e.g. a metafield) and/or due to a data permission feature. To address this, in some implementations the merged query includes this request and supplement it with the ID. However, different individual queries might have different IDs, e.g. because they relate to different applications that are being executed that have different IDs. Therefore, instructions to add the ID may be included in the individual query. For example, the individual query may be modified to include instructions to add the ID when the individual query is processed, at the same time the other processing discussed above is performed (e.g. to add tags and/or validate the query). The stored map for that individual query may then include a mapping from the portion of the merged response associated with that ID back to the individual query. For example, in the mapping 742 in FIG. 9, at 757 the "suffix_with_context_key" for the metafield object includes "api_client_id". This indicates that the portion of the merged response that is specifically associated with that api_client_id is to be mapped back to this particular individual query 712.

In view of the above, in some implementations of the method of FIG. 6 a particular individual data query may include a particular data request that requires providing an ID as part of the data request, where the ID is associated with the particular individual data query. In such implementations, the method of FIG. 6 may involve including, in the merged data query, the particular data request and the ID. The method of FIG. 6 may further involve including, in the map for the particular individual data query, an indication of the ID to associate the particular data request in the merged data query with the particular individual data query. An example is illustrated at 757 of FIG. 9 in which the map 742 for particular individual data query 712 includes an indication of the ID ("api_client_id") to associate the "metafield" data request in the merged query with the individual data query 712.

A technical benefit is achieved in that a merged query can be executed instead of the plurality of individual queries, resulting in the reduced computer operations discussed above (e.g. fewer query operations/data fetches compared to executing each individual data query, while still fetching all data requested by all of the individual data queries). Moreover, individual queries that include data requests requiring particular IDs can be accommodated. This allows for merging of individual queries regardless of whether one or more individual queries include a data request requiring the passing of an ID unique to the individual query.

Another challenge that may occur in some implementations of the method of FIG. 6 is that executing a query may involved the computer 202 transmitting the query to an API, e.g. like in the example of FIG. 1. However, the API used to access the data might have different versions, and a data field might change type between the different versions. For example, a field "Rating" in the API schema may be defined as an integer in one version of the API and may instead be defined as a string in another version of the API. Different individual queries may be accessing different versions of the API. To address this, in some implementations the merged query keeps these entries separate. For example, in the example just presented the merge query would request the "Ratings" data field twice, each from the respective different API version. These separate requests can be assigned separate tags that each uniquely map back to the respective individual query that requested the data field. A technical benefit is achieved in that a merged query can be executed instead of the plurality of individual queries, resulting in the reduced computer operations discussed above (e.g. fewer query operations/data fetches compared to executing each individual data query, while still fetching all data requested by all of the individual data queries). However, individual queries that include data requests to different API versions can still be accommodated. This allows for merging of individual queries regardless of whether different individual queries operate with different versions of the API.

In the explanations above, many different implementations of FIG. 6 are described, and these different implementations may be combined. An overview of one example implementation of FIG. 6 is as follows.

Step 1—Preprocessing when an application is deployed: At the time the application is deployed (e.g. at "upload" of the application) an individual query that is part of the application (i.e. is to be executed when the application is executed) is processed as follows. The query is checked to confirm that it is valid, e.g. by validating it against the schema associated with the API. It is determined which requests in the query need to be tagged (e.g. via the functionInstanceID and api_client_id in the examples above), and the appropriate instruction (e.g. directive in GraphQL™) is added to the query. The result is a processed individual query. An example of such a query is shown at 702' of FIG. 7.

Step 2—Generate the merged query: When multiple queries need to be executed, a merged query is generated by merging together the processed individual queries, eliminating duplicate data field requests. Merging the queries is done at runtime. In one example, a query merger is run to merge all required processed individual queries from a batch of applications into one single merged query. The tags (e.g. suffixes) discussed above are applied such that the resulting merged query is "aliased" to avoid issues such as duplicate entries (originating from different entities) described above.

Step 3—Execute the merged query: The merged query is executed to obtain a response (e.g. JSON output) containing all the required data. Compared to executing each query individually, this results in an efficiency save in both time and resources used to walk/iterate the data structure.

Step 4—Map the output of the merged query back to individual responses for each query: The response to the merged query is then "unmerged" using the mapping for each individual query to return all expected fields as a response to the individual queries. Example mappings are shown above, e.g. example mappings 326, 328, 742, and 782.

CONCLUSION

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Memory, as used herein, may refer to memory that is persistent (e.g. read-only-memory (ROM) or a disk), or memory that is volatile (e.g. random access memory (RAM)). The memory may be distributed, e.g. a same memory may be distributed over one or more servers or locations.

The invention claimed is:

1. A computer-implemented method comprising:

executing different applications responsive to one or more events occurring during computer operation, each application of at least some of the applications requiring the execution of a respective one or more data queries associated with the application;

rather than executing all of the data queries, for at least a plurality of individual data queries associated with different applications:

generating a merged data query that includes, for each data request in each individual data query of the plurality of individual data queries, a corresponding data request in the merged data query, wherein for two or more of the plurality of individual data queries each requesting same particular data, only a single corresponding data request requesting the particular data is included in the merged data query;

executing the merged data query to obtain a merged response having the data requested by the merged data query; and for each individual data query:

mapping the data in the merged response that is requested by the individual data query to a response for the individual data query; and providing the data requested by the individual data query by providing the response for the individual data query.

2. The computer-implemented method of claim 1, further comprising:

generating and storing, for each individual data query, a map that indicates which data from the merged response is to be included in the response for the individual data query.

3. The computer-implemented method of claim 2, wherein, for each individual data query, the individual data query specifies one or more data requests by specifying one or more objects and, for at least one object, by specifying one or more fields of the object;

wherein the merged data query also specifies one or more objects and, for at least one object, specifies one or more fields of the object, wherein the specified one or more objects and the specified one or more fields in the merged data query encompass every object and field specified in the individual data queries; and wherein, for two or more of the individual data queries that request the same particular data by each specifying a same particular field within a same particular object, the merged query only specifies the particular object once and only specifies the particular field once within the particular object;

the method further comprising:

for each individual data query, generating the response for the individual data query, including providing in the response respective data mapped from the merged response for each of the one or more fields specified by the individual data query.

4. The computer-implemented method of claim 3, wherein a structure of the individual data query, including the one or more objects and the one or more fields specified by the individual data query, defines a response structure of the response for the individual data query; and wherein generating the response for the individual data query comprises generating the response to have the response structure defined by the structure of the individual data query.

5. The computer-implemented method of claim 4, wherein the response structure for the individual data query is in JavaScript Object Notation (JSON) format, and the map indicates, for each field of the one or more fields specified by the individual data query, which data from the merged response is to be included for that field in the response for the individual data query.

6. The computer-implemented method of claim 2, wherein responsive to multiple individual data queries of the plurality of individual data queries each requesting a same contextual data field, the method further comprises:

including, in the merged data query, multiple requests for the contextual data field, each request of the multiple requests associated with a respective tag that uniquely links the request back to a corresponding individual data query; and for each corresponding individual data query, including in the map for the corresponding individual data query an indication of the respective tag that is associated with the request for the contextual data field in the merged data query.

7. The computer-implemented method of claim 6, wherein prior to the one or more events occurring during the computer operation, processing at least some of the plurality of individual data queries, wherein the processing comprises:

for each individual data query that requests the contextual data field, identifying the request for the contextual data field and modifying the individual data query to include an instruction to associate the unique tag with the request for the contextual data field.

8. The computer-implemented method of claim 7, wherein the processing further comprises:

for each individual data query of the plurality of individual data queries, validating the individual data query against a schema used to retrieve the data requested in the individual data query.

9. The computer-implemented method of claim 8, wherein each individual data query of the plurality of individual data queries is associated with a respective application that, when executed, utilizes data in the response for the individual data query, and wherein the processing is performed responsive to deployment of the respective application.

10. The computer-implemented method of claim 2, wherein a particular individual data query includes a particular data request that requires providing an identifier (ID) as part of the data request, the ID associated with the particular individual data query, and wherein the method further comprises:

including, in the merged data query, the particular data request and the ID; and including, in the map for the particular individual data query, an indication of the ID to associate the particular data request in the merged data query with the particular individual data query.

11. The computer-implemented method of claim 2, wherein a particular individual data query includes a custom name for particular data, and wherein the map for the particular individual data query indicates a mapping back to the custom name from the corresponding data in the merged response.

12. The computer-implemented method of claim 1, wherein executing the merged data query to obtain the merged response comprises transmitting the merged data query to an application programming interface (API) and receiving the merged response from the API in JSON format.

13. The computer-implemented method of claim 1, wherein the one or more events occurs responsive to user input.

14. A system comprising:

at least one processor; and a memory storing processor-executable instructions that, when executed by the at least one processor, cause the system to:

execute different applications responsive to one or more events occurring during computer operation, each application of at least some of the applications requiring the execution of a respective one or more data queries associated with the application;

rather than executing all of the data queries, for at least a plurality of individual data queries associated with different applications:

generate a merged data query that includes, for each data request in each individual data query of the plurality of individual data queries, a corresponding data request in the merged data query, wherein for two or more of the plurality of individual data queries each requesting same particular data, only a single corresponding data request requesting the particular data is included in the merged data query;

execute the merged data query to obtain a merged response having the data requested by the merged data query; and for each individual data query:

map the data in the merged response that is requested by the individual data query to a response for the individual data query; and provide the data requested by the individual data query by providing the response for the individual data query.

15. The system of claim 14, wherein the instructions, when executed by the at least one processor, further cause the system to generate and store, for each individual data query, a map that indicates which data from the merged response is to be included in the response for the individual data query.

16. The system of claim 15, wherein for each individual data query, the individual data query specifies one or more data requests by specifying one or more objects and, for at least one object, by specifying one or more fields of the object;

wherein the merged data query also specifies one or more objects and, for at least one object, specifies one or more fields of the object, wherein the specified one or more objects and the specified one or more fields in the merged data query encompass every object and field specified in the individual data queries; and wherein for two or more of the individual data queries that request the same particular data by each specifying a same particular field within a same particular object, the merged query only specifies the particular object once and only specifies the particular field once within the particular object;

wherein the instructions, when executed by the at least one processor, further cause the system to: for each individual data query, generate the response for the individual data query, including providing in the response respective data mapped from the merged response for each of the one or more fields specified by the individual data query.

17. The system of claim 16, wherein a structure of the individual data query, including the one or more objects and the one or more fields specified by the individual data query, defines a response structure of the response for the individual data query; and wherein generating the response for the individual data query comprises generating the response to have the response structure defined by the structure of the individual data query.

18. The system of claim 17, wherein the response structure for the individual data query is in JavaScript Object Notation (JSON) format, and the map indicates, for each field of the one or more fields specified by the individual data query, which data from the merged response is to be included for that field in the response for the individual data query.

19. The system of claim 15, wherein the instructions, when executed by the at least one processor, further cause the system to:

responsive to multiple individual data queries of the plurality of individual data queries each requesting a same contextual data field:

include, in the merged data query, multiple requests for the contextual data field, each request of the multiple requests associated with a respective tag that uniquely links the request back to a corresponding individual data query; and for each corresponding individual data query, include in the map for the corresponding individual data query an indication of the respective tag that is associated with the request for the contextual data field in the merged data query.

20. A non-transitory computer readable medium having stored thereon computer-executable instructions that, when executed by a computer, cause the computer to perform operations comprising:

executing different applications responsive to one or more events occurring during computer operation, each application of at least some of the applications requiring the execution of a respective one or more data queries associated with the application;

rather than executing all of the data queries, for at least a plurality of individual data queries associated with different applications:

generating a merged data query that includes, for each data request in each individual data query of the plurality of individual data queries, a corresponding data request in the merged data query, wherein for two or more of the plurality of individual data queries each requesting same particular data, only a single corresponding data request requesting the particular data is included in the merged data query;

executing the merged data query to obtain a merged response having the data requested by the merged data query; and for each individual data query:

mapping the data in the merged response that is requested by the individual data query to a response for the individual data query; and providing the data requested by the individual data query by providing the response for the individual data query.

* * * * *